(12) United States Patent
Veitch et al.

(10) Patent No.: US 6,718,434 B2
(45) Date of Patent: Apr. 6, 2004

(54) METHOD AND APPARATUS FOR ASSIGNING RAID LEVELS

(75) Inventors: Alistair C. Veitch, Mountain View, CA (US); Eric A. Anderson, Berkeley, CA (US); Ram Swaminathan, Cupertino, CA (US); Guillermo Alvarez, San Jose, CA (US); Richard Golding, San Francisco, CA (US); Ted Romer, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 109 days.

(21) Appl. No.: 09/871,043

(22) Filed: May 31, 2001

(65) Prior Publication Data

US 2002/0184442 A1 Dec. 5, 2002

(51) Int. Cl.[7] .................................................. G06F 13/00
(52) U.S. Cl. ...................... 711/114; 711/154; 711/162; 711/170; 711/203
(58) Field of Search .......................................... 711/114

(56) References Cited

U.S. PATENT DOCUMENTS

| | | | | |
|---|---|---|---|---|
| 5,495,607 A | * | 2/1996 | Pisello et al. ................. 707/10 |
| 5,586,250 A | * | 12/1996 | Carbonneau et al. ......... 714/44 |
| 5,666,114 A | * | 9/1997 | Brodie et al. ................. 341/50 |
| 6,026,354 A | * | 2/2000 | Singh et al. ................. 702/186 |
| 6,065,096 A | * | 5/2000 | Day et al. .................... 711/114 |
| 6,098,119 A | * | 8/2000 | Surugucchi et al. .......... 710/10 |
| 6,138,125 A | * | 10/2000 | DeMoss ....................... 707/202 |
| 6,272,590 B1 | * | 8/2001 | Riedle ......................... 711/113 |
| 6,321,358 B1 | * | 11/2001 | Anderson .................... 714/763 |
| 6,442,682 B1 | * | 8/2002 | Pothapragada et al. ........ 713/1 |
| 2003/0033485 A1 | * | 2/2003 | Ohr ............................. 711/133 |

OTHER PUBLICATIONS

Wilkes et al., "The HP AutoRAID hierarchical storage system", ACM Transactions on Computer Systems, vol. 14, NO. 1, Feb., 1996.

* cited by examiner

Primary Examiner—Reba I. Elmore

(57) ABSTRACT

RAID levels are assigned to data prior to loading the data on a disk array or other data storage device. The RAID levels are determined by applying an algorithm (e.g., a rule-based criteria, a utilization model) to data workload specifications and device specifications.

36 Claims, 3 Drawing Sheets

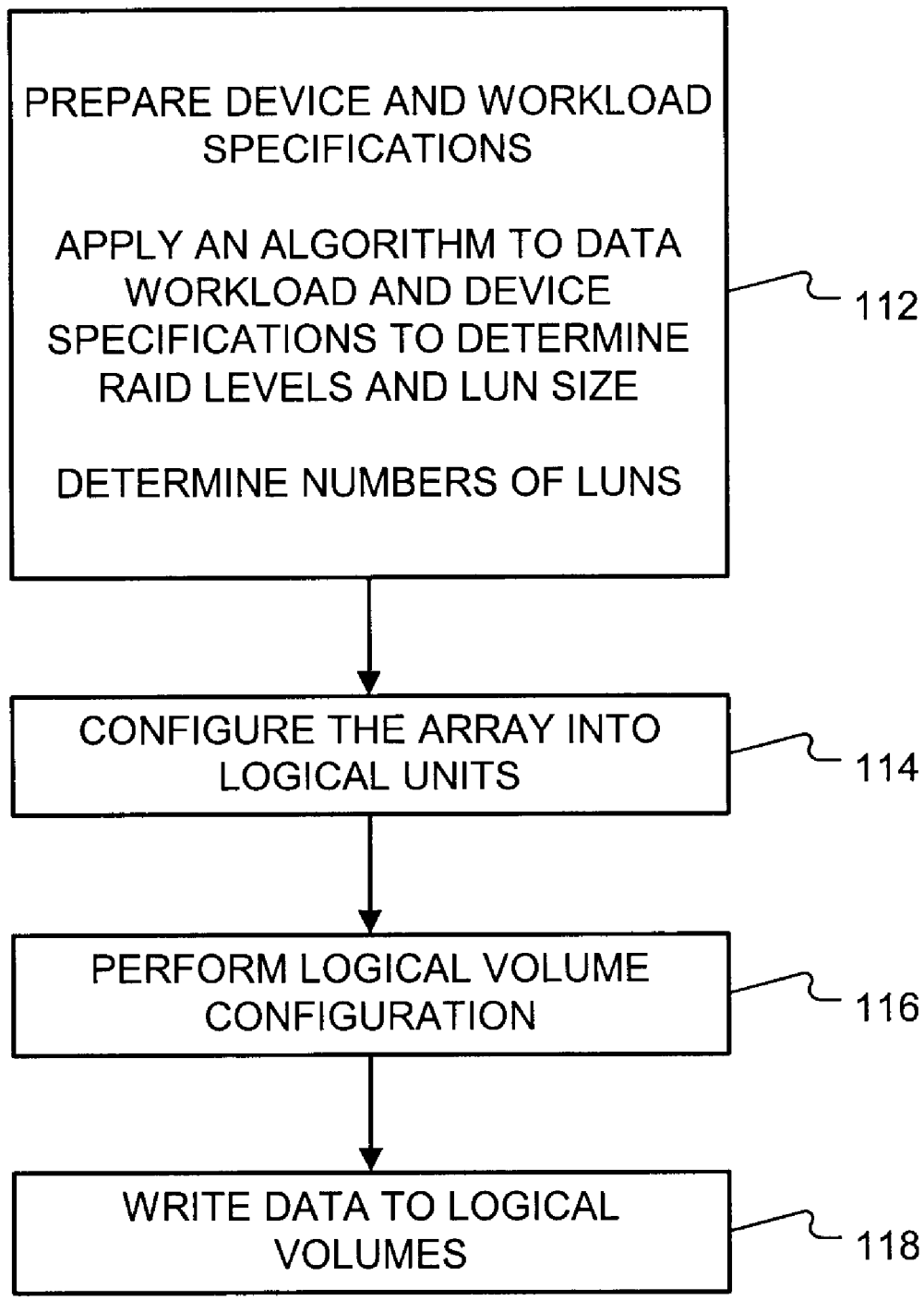

METHOD AND APPARATUS FOR ASSIGNING RAID LEVELS

BACKGROUND

The present invention relates to data storage systems. More specifically, the present invention relates to redundant arrays of independent disks (RAID) and mapping client data on storage devices.

Many businesses and individuals depend on information stored in their computer systems. Even though modern disk drives have mean-time-to-failure (MTTF) values measured in hundreds of years, a sufficiently large collection of disk drives can experience frequent failure.

RAID is commonly used to provide protection against failure. For small numbers of disks, the preferred method of fault protection is duplicating (mirroring) data on two disks with independent failure modes. Using RAID 1 (mirroring) or RAID 1/0 (striped mirroring), two copies of data are stored on different disks. If one disk fails and the copy thereon becomes inaccessible, the copy on the other disk can be accessed.

For data storage devices having large numbers of disks, a more cost-effective method of fault protection is using partial redundancy (such as parity). Using RAID 5 (striping with rotated parity), host data blocks are block-interleaved across the disks, and the disk on which the parity block is stored rotates in round-robin fashion for different stripes. A RAID group having N disks will use 1/N of the storage capacity for storing the redundancy (parity) data. If one of the disks is damaged, the parity data is used to reconstruct the data.

Consider an example in which data is striped over four disks. Data blocks C0, C1 and C2 are stored on the first, second and third disks and parity data P0 is stored on the fourth disk. If the second disk fails, the parity data P0 and the first and third blocks C0 and C2 may be used to reconstruct the second block C1.

Recovering lost data via RAID is much faster than reloading the lost data from backup tapes. In large data storage systems, reloading the lost data from backup tapes can take hours or even days, resulting in very costly downtime.

However, different RAID levels have different performance characteristics and costs. With RAID 1/0 storage, disk space is doubled to store the redundant information. For example, two megabytes of disk space are used to store one megabyte of data. Doubling the disk space doubles the cost of storage.

RAID 5 has a lower storage cost because a smaller fraction of the disk space is used for storing redundant information. However, RAID 5 suffers reduced performance in "degraded" mode—when one of the drives has failed and/or data needs to be repaired. Because data is reconstructed from redundant information, additional I/O operations are performed.

Moreover, RAID 5 can have a higher overhead when writing to disks. For each write operation, parity data is re-calculated. Thus, a small write penalty is incurred because disk reads are performed on the data that does not change in order to calculate the new parity data. In contrast, RAID 1/0 does not incur this write penalty. For large writes however, RAID 5 can provide better performance, as extra writes have to be made for the parity data only, as opposed to every block, which must be replicated in RAID 1/0.

RAID 1/0 offers potentially higher reliability than RAID 5. In RAID 5, the loss of any two disks will result in the loss of data. In RAID 1/0, higher reliability results from the data being mirrored: even if two disks fail, the chance of data being lost is substantially lower, as the two disks may be in different mirrored pairs.

When initially mapping data to a disk array, it is very desirable to choose the best RAID level. A wrong choice can be costly because poor performance and resource utilization, or decreased availability could result. Choosing the wrong RAID level could also result in increased storage costs, due to the relative amount of redundant data kept in different RAID schemes.

Correcting a wrong choice can also be costly: it can involve bringing a system off-line (since most RAID controllers do not allow RAID levels to be changed on the fly), copying data from the array to another storage device, reformatting the array and then reloading the data onto the reformatted array. This process can take hours. In addition, loss of data can potentially occur due to mistakes at any of these stages.

Wrong choices can add up for large enterprise systems, where tens to hundreds of host computers are connected by a storage area network to tens to hundreds of storage devices having tens of thousands of disks. Thus, wrong choices for large enterprise systems can be very costly.

SUMMARY

According to one aspect of the present invention, RAID levels are assigned to data prior to loading the data in a data storage device. The RAID levels are determined by applying an algorithm to at least one of a set of device specifications and data workload specifications.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 3 is a flowchart of a method including assigning RAID levels to client data.

DETAILED DESCRIPTION

Figure 1:
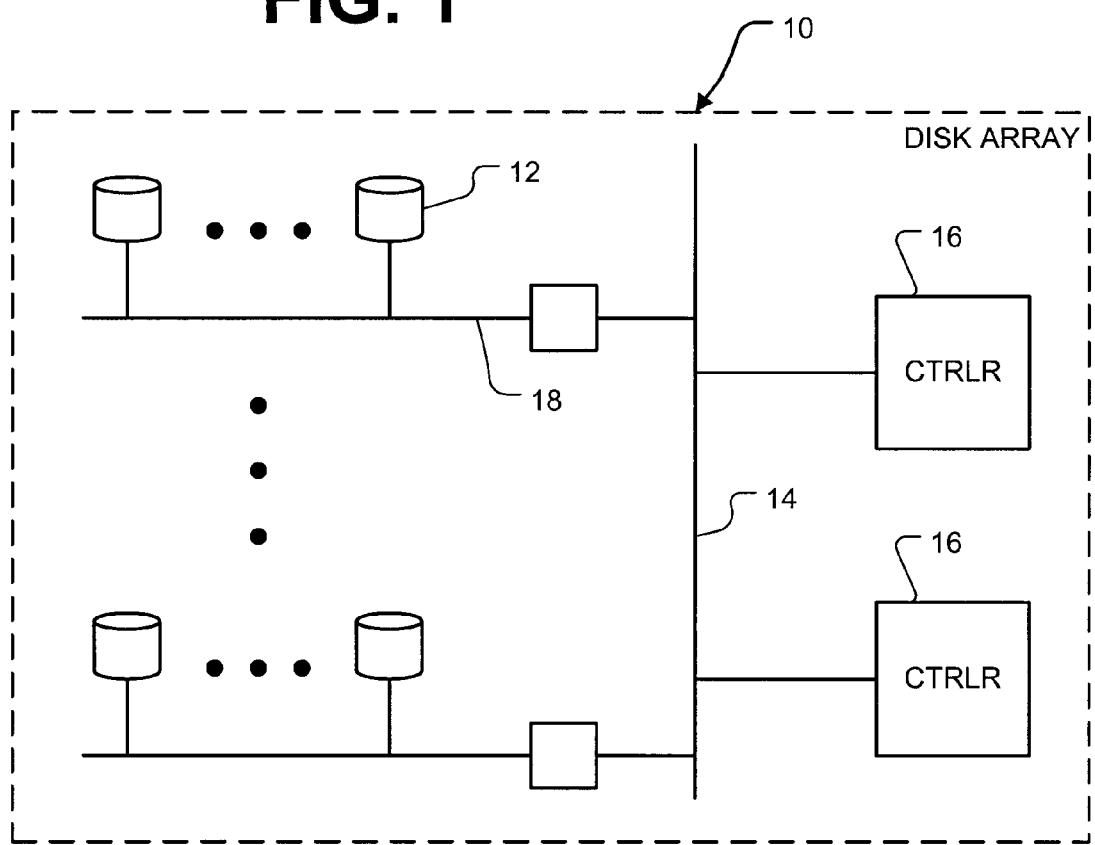
FIG. 1 is an illustration of a disk array.

As shown in the drawings for purposes of illustration, the present invention is embodied by an apparatus and method for assigning RAID levels to data. The RAID levels are assigned prior to loading the data in a data storage device. An algorithm is applied to at least one of a set of workload and device specifications. The algorithm identifies the optimal RAID levels for that workload and device, based on business goals such as highest performance, lowest cost and highest availability.

This approach reduces the chances of making an incorrect decision. It can save time and money and improve reliability, especially for those storage systems that cannot change RAID levels and data assignments on the fly.

The method and apparatus will be described in connection with a disk array. This is done merely to help explain the method and apparatus. The method and apparatus may be applied to other storage systems and caching/replication systems.

Reference is made to FIG. 1. An exemplary disk array 10 includes a set of disks 12, a bus interconnect 14, and controllers 16 (each controller 16 including, for example, a processor, RAM, control logic, parity logic, caches, and buffers). Back-end busses 18 provide connections between the disks 12 and the bus interconnect 14. The disk array 10 may have a front-end bus (not shown) that allows front-end connections to a host (e.g., a server).

A device specification may include disk array characteristics such as number of disks, storage capacity, cache sizes and characteristics, possible RAID levels and performance metrics such as sustainable I/O request rates and bandwidth (for all components of the array). The device specification may also include a great number of disk array configuration parameters including, but not limited to, data-layout choice, parity-layout choice, stripe depth, stripe width, cache size, and write-back policies. Each controller 16 sets the configuration parameters of the disk array 10 in response to external commands (e.g., commands from a host). The device specification could be obtained from the device manufacturer or it could be obtained by measurement of the device.

A workload specification indicates characteristics of the data to be loaded on the disk array 10. Applications using the data may include, but are not limited to, file systems, scientific applications, on-line transaction processing (OLTP) databases and decision-support databases.

The workload specification may be obtained from a workload library or from human expertise about the application access patterns. An informed assessment of the workload requirements for the disk array 10 might include predictions of current workload requirements and growth trends in workloads. A workload prediction might be based on loads generated by a predetermined number of users in existing computer systems. The workload specification might also reflect business goals: system attributes that are desired by a customer or client. Such attributes might include transaction rates, response times, relative performance requirements, growth expectations, cost-versus-performance emphasis, and availability goals.

In the alternative, or in addition, the workload specification may be obtained from the output of a workload characterization tool applied to measurements or traces generated by executing the same applications on an existing system. One such workload characterization tool is disclosed in assignee's U.S. Ser. No. 09/249,399 filed on Feb. 12, 1999 and issued as U.S. Pat. No. 6,269,410, the specification of which is incorporated herein by reference. The data is described in terms of stores and streams.

Figure 2:
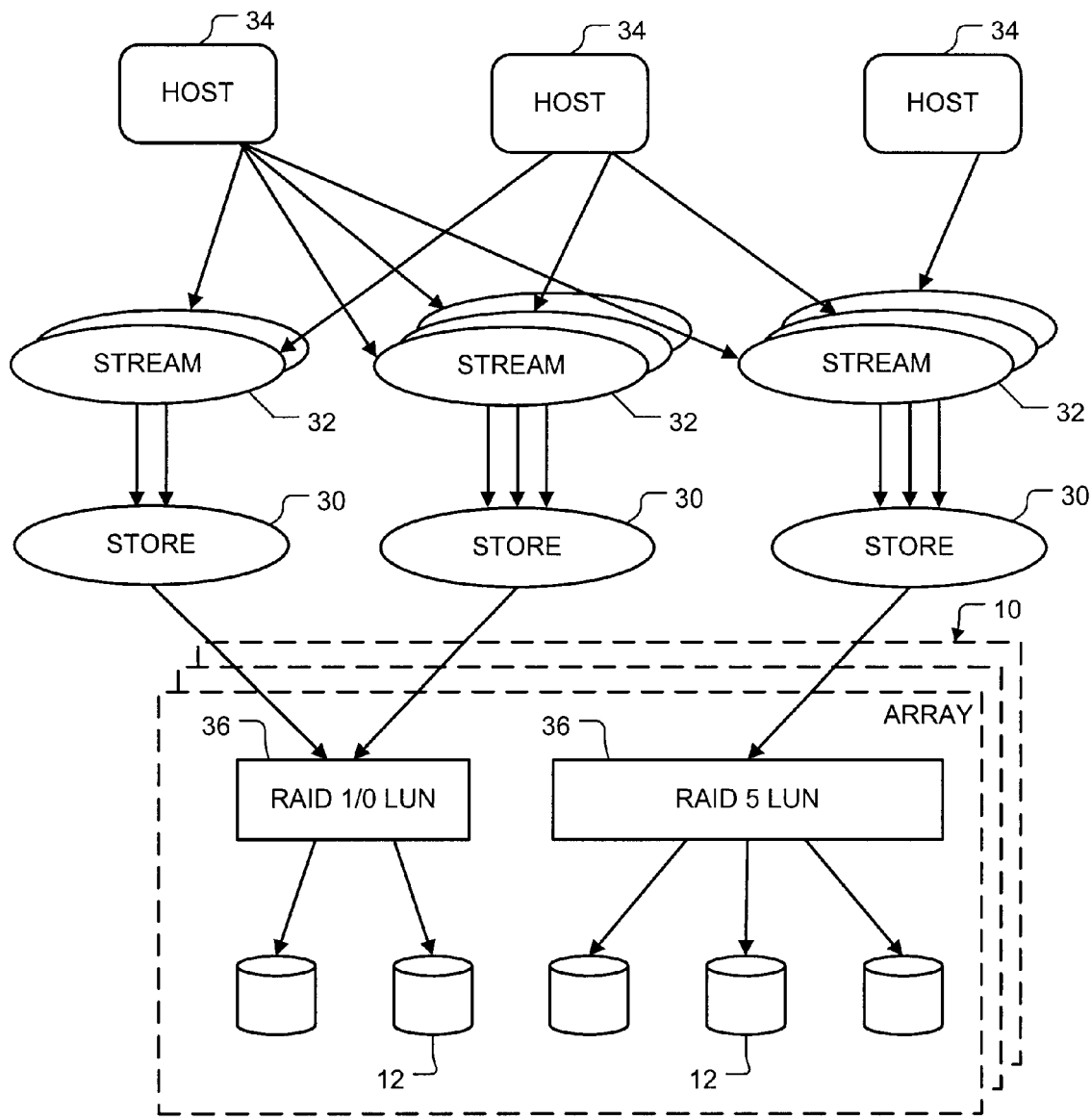
FIG. 2 is an illustration of data characterized by stores and streams.

Reference is now made to FIG. 2. Stores 30 may be characterized as logically contiguous chunks of data such as a database table or a file system. Each store 30 is an object, which includes one or more attributes. Attributes may include name, size and RAID level.

Streams 32 may be bound to the stores 30. A stream 32 may be characterized as a contract between application behaviors (e.g., request rates) and system performance requirements (e.g., promised response times, quality of service guarantees). The stream 32 captures dynamic aspects of the workload, including temporal requirements and behavior. A stream 32 may be described by attributes including, but not limited to, onTime and offTime (the stream alternates between being ON and OFF, and these attributes measure the time in seconds for each phase); requestRate (the number of I/O operations per second); requestSize (the size of the I/O operations in bytes—when ON, the stream behaves as described by the requestRate and requestSize attributes); runCount (sequential locality is modeled by counting the number of consecutive I/O requests issued to consecutive addresses); and overlapFraction (a correlation of ON time activity between two streams—how often the second stream is ON when the first stream is turned ON). Each of these parameters may be described as averages or distributions.

Certain stores 30 may have no streams 32, but each stream 32 will be assigned to at least one store 30. Moreover, different streams 32 may be assigned to the same store 30. Hosts 34 run the applications that use the stores 30. The hosts 34 may have attributes that affect storage choices (e.g., some volume managers can perform software RAID over a set of disks).

Logical Units ("LUNs") 36 are composed of disks 12. LUNs 36 within the same array may share the same front and back end connections, cache, internal buses, and disks. By way of example, FIG. 2 shows a first LUN 36 striped across two disks 12 and a second LUN 36 striped across three disks 12. The first and second stores are assigned to a RAID 1/0 LUN and a third store is assigned to a RAID 5 LUN. Multiple streams are associated with each store.

FIG. 3 shows an exemplary method of assigning RAID levels to data prior to loading the data in a disk array. In this example, the data will be characterized as stores and streams. For simplicity, the method will be described in connection with one stream per store. In addition, the disk array will be described as having only two RAID levels: RAID 1/0 and RAID 5.

Device and specifications are prepared (block 112). Consistent with this example, the workload specification describes the data in terms of stores and streams.

Next the size of LUNs and the RAID levels for those LUNs are determined (block 112). The "optimal" RAID levels and LUN sizes are determined by applying an algorithm to the data workload and device specifications. What is optimal is based on external criteria such as least cost, most efficient, most fault-tolerant, etc. For example, the algorithm might determine that five disks of the disk array should be used for a RAID 5 LUN and six disks should be used for a RAID 1/0 LUN. Two different examples of determining the optimal RAID levels will be described below. The optimal LUN sizes may be selected from a set of predetermined values. For example, the optimal value may be selected according to the number or size of stores allocated to each RAID level.

Once the RAID levels and sizes of the LUNs have been determined, the number of LUNs needed is determined (block 112). A rough estimate of number of LUNs may be computed by dividing their capacities into the size of the stores.

Preparing the device and workload specifications, determining the size of LUNs and the RAID levels for those LUNs, and determining the number of LUNs may be performed sequentially or simultaneously.

The choice of RAID level can be optimized at the same time as an optimal assignment of stores onto arrays is calculated. This takes into account possible interactions between stores as they are assigned to different LUNS.

The array is configured into the LUNs by sending device-specific commands to the array (block 114). The disk array 10 may or may not allow LUN configurations to be changed on-the-fly.

After the disk array has been configured, a Logical Volume configuration may be performed (block 116). Software commands are sent to hosts to specify how stores should be mapped on the LUNs. After the Logical Volume configuration has been performed, the data may be written to the specified logical volumes (block 118).

Configuring the array into LUNs (block 114) and performing the Logical Volume configuration are described in greater detail in assignee's U.S. Ser. No. 09/755,891 filed Jan. 6, 2001 and incorporated herein by reference.

This method may be performed when a system is initially configured. It may also be performed when a system is changed (devices are added or removed), or when the workload changes (e.g. a different host machine is used, or the number of users changes).

Two examples of the algorithm will now be provided. In the first example, the algorithm includes a set of rules. The rules are applied to each store and its associated streams. As the rules are being applied to a store, testing may be stopped when a rule is satisfied (fires). The RAID level corresponding to the fired rule is assigned to the store under test. Thus the store is assigned a RAID level corresponding to the first rule that fires.

A default level may be applied to a store if no other rule fires. For example, the default RAID level would be RAID 5 if a low storage cost is desirable (since RAID 5 has a lower storage cost than RAID 1/0).

Consider the following exemplary rules. RAID 5 storage performance is less than that of RAID 1/0 storage for applications involving many small (less than a half-stripe) random writes. Therefore, the following rule might be used: if the majority of I/O requests in a stream are small writes, the RAID level of the corresponding store should be RAID 1/0.

Applications involving many large (greater than a half-stripe) writes are better suited for RAID 5 storage. Therefore, the following rule might be used: if the majority of I/O requests in a stream are large sequential writes, the RAID level of the corresponding store should be RAID 5.

The rules might become more involved if multiple streams are bound to a store. In this case, the attributes from the various streams are added together so as to be able to produce an expected workload for the store. Consider the example of two streams accessing the same store, one consisting entirely of large sequential writes at a rate of 50 per second, and the other consisting entirely of small random writes at a rate of 20 per second. Adding the streams together produces a stream in which the majority of the accesses are large sequential writes, satisfying the rule just described.

One or more utilization rules may be applied to the data. The utilization rules check whether a component (a disk, a LUN) can handle the workload imposed by the assigned streams.

A store might be capacity-bound or bandwidth-bound. If a store is capacity-bound, additional disks are needed even though bandwidth is available. If a store is bandwidth-bound, the bandwidth required by the streams is equal to or exceeds the bandwidth capacity of the disks in the array; therefore, the number of accesses per second necessitates the use of more disks to access the data, even though disk space is available.

It is often more desirable to assign a bandwidth-bound store to a RAID 1/0 LUN. Therefore, the following rule might be used: if a store is bandwidth bound, the RAID attribute of the corresponding store is RAID 1/0.

It is usually desirable to assign a capacity-bound store to a RAID 5 LUN. Therefore, the following rule might be used: if a store is capacity bound, the RAID attribute of the corresponding store is RAID 5.

After each of the stores has been tested against each of the rules, a further set of rules could be applied to an aggregate set of stores to better minimize the number of LUNs required. An example of such a rule might be as follows: If only a small number of RAID 1/0 LUNs are required, and there is free capacity on a RAID 5 LUN, then at least some RAID 1/0 stores are assigned to RAID 5. Such a rule might be desirable if, for instance, the business goal was lowest cost, as it would reduce the total number of LUNs.

The rules described above are merely exemplary. The "best" set of rules that best satisfy the business goals and the order in which rules are tested is device-specific and somewhat subjective. The rules are somewhat arbitrary in that they can be changed according to policy. The rules might also take business goals into account. The business goals will vary from customer-to-customer.

Situations might arise where a group of rules is satisfied. There are various ways of selecting a rule from the group. For example, the first rule that fires may be selected, or voting among the fired rules may be performed, or rules may be weighted so that certain rules are more important than others. Weighting of the rules can degenerate into the "first rule satisfied" case if the rules are tested in order of importance.

In the second example, the algorithm includes a model of the device and the workload. A model is a set of formulas that, given a particular workload, or combination of workloads, determines the utilization of device components in various array configurations. Using this utilization model, the optimal RAID levels and other array configuration parameters can be determined by selecting the RAID level that results in the smallest array utilization.

The utilization of a disk array can be calculated as the percentage of available resources used by a particular workload. Typically, utilization figures can be calculated for each component (e.g., controller, disk) of the array, and could be specified as a limit on the number of operations per second, total bandwidth available, or a combination thereof. For example, if a controller is capable of performing 10,000 I/O operations per second, and the workload is generating 2000 I/O operations per second, then that controller would be 20% utilized. However that same workload might utilize 100% of one of the arrays disks if the workload was assigned to a RAID 1/0 LUN and only 50% for a RAID 5 LUN. In this case, the lower utilization percentage indicates that a RAID 5 LUN would be a better choice for this workload, as it results in lower array utilization.

Different RAID levels have different configuration parameters. The model can be used to evaluate different utilization scenarios for different configuration parameters, thus identifying the optimal configuration parameters for a given set of data workload and device specifications. Important configuration parameters might include number of disks in the LUN, stripe size and cache allocations and policies.

Figure 4:
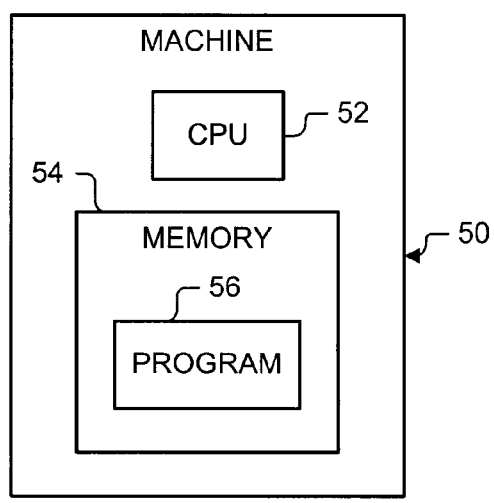
FIG. 4 is an illustration of an apparatus for configuring the disk array and mapping data to the disk array.

Reference is now made to FIG. 4, which illustrates a machine 50 for allocating the number and size of LUNs and assigning RAID levels to the LUNs. The machine 50 includes one or more central processing units 52 and persistent memory 54 (e.g., one or more hard drives). The persistent memory 54 stores a program 56 (including executable instructions and data) for instructing the central processing unit 52 to receive the workload and device specifications (the specifications may be supplied as input files) and apply the algorithm to the specifications. For example, the program 56 might instruct the central processing unit 52 to perform the method shown in FIG. 3.

Although the method and apparatus have been described in connection with RAID 1/0 and RAID 5, they are not so limited. Other RAID levels may be considered.

Assignment of RAID levels has been described in connection with a single storage device. However, the assignment may be performed simultaneously on multiple data storage devices.

Although the method and apparatus were described above in connection with disk arrays, it is not so limited. The invention may be applied to other storage systems and caching/replication systems. For instance, the method and apparatus may be applied to a storage system having multiple disks connected directly to hosts, or a system having multiple disks and a front end bus but no controller or cache.

The present invention is not limited to the specific embodiments described and illustrated above. Instead, the present invention is construed according to the claims that follow.

What is claimed is:

1. A method of assigning RAID levels to data prior to loading the data in a data storage device, the device allowing multiple RAID levels, the method comprising accessing at least one of a set of device specifications and workload specifications that characterize the data to be loaded in the data storage device; and applying an algorithm to the at least one set to determine at least one RAID level for the data.

2. The method of claim 1, wherein the algorithm also identifies LUN sizes for the data.

3. The method of claim 1, wherein the data is characterized as at least one store, and wherein the algorithm includes at least one rule that is applied to at least one store.

4. The method of claim 3, wherein the data is further characterized as at least one stream, and wherein the algorithm includes at least one rule that is also applied to at least one stream.

5. The method of claim 4, wherein attributes from multiple streams bound to a store are combined to produce an expected workload for the store.

6. The method of claim 1, wherein the data is characterized by estimated workloads.

7. The method of claim 1, wherein the algorithm includes at least one rule; and wherein at least one rule is applied to the data, and a RAID level corresponding to a satisfied rule is assigned to the data.

8. The method of claim 7, wherein the RAID level corresponding to the first rule that is satisfied is assigned to the data.

9. The method of claim 7, wherein a default rule is applied to the data if none of the rules fire.

10. The method of claim 7, wherein the RAID level is determined by applying at least one utilization rule to the data.

11. The method of claim 10, wherein the utilization rules include a rule for capacity-bound workloads, and wherein an appropriate RAID level is assigned to capacity-bound workloads.

12. The method of claim 10, wherein at least one of sequence length, I/O request size and rates and overlaps between streams are considered when selecting the RAID level.

13. The method of claim 10, wherein the utilization rules include a rule for bandwidth-bound workloads, and wherein an appropriate RAID level is assigned to bandwidth-bound workloads.

14. The method of claim 7, wherein the algorithm also identifies LUN sizes for the data; and wherein a further set of rules is applied on an aggregate set of data to minimize the number of LUNs.

15. The method of claim 1, wherein the algorithm includes a model of the device and data workload, which is used to determine the RAID levels.

16. The method of claim 15, wherein the model includes a set of formulas that, given a particular workload, or combination of workloads, determines the utilization of components of the device, and wherein the utilization is calculated for each component as a limit of at least one of the number of operations per second and total bandwidth available.

17. The method of claim 15, wherein the model is used to determine device configuration parameters in addition to RAID levels; and wherein the RAID levels and device configuration parameters are determined by selecting the RAID level that results in the smallest array utilization.

18. The method of claim 15, wherein the data is characterized as at least one store and stream; and wherein if a store is not capacity-bound, at least one of the following numbers is estimated and the RAID level resulting in the smallest number is selected: available bandwidth and the number of I/O operations per second (IOPS) that will be generated by each stream for each RAID level being considered.

19. A method of configuring a data storage device allowing multiple levels of a redundancy hierarchy, the method comprising:
using rule-based criteria to determine redundancy levels and logical unit sizes for the device; and
configuring the data storage device for logical units having the sizes and redundancy levels determined by the criteria.

20. Apparatus for assigning RAID levels to data prior to loading the data in a data storage device, the apparatus comprising a processor for applying an algorithm to at least one of a set of device specifications and workload specifications for the data to determine RAID levels for the data; and configuring the data storage device according to the RAID levels identified by the algorithm.

21. The apparatus of claim 20, wherein the algorithm also identifies LUN sizes for the data; and wherein the logical units are also configured according to the LUN sizes identified by the criteria.

22. The apparatus of claim 20, wherein the data is characterized as at least one store, and wherein the algorithm includes at least one rule that is applicable to at least one store.

23. The apparatus of claim 22, wherein the data is further characterized as at least one stream, and wherein the algorithm includes at least one rule that is also applicable to at least one stream.

24. The apparatus of claim 23, wherein the algorithm adds attributes from multiple streams bound to a store to predict expected utilization of the device.

25. The apparatus of claim 20, wherein the algorithm includes at least one rule; and wherein at least one rule is applied to the data, and a RAID level corresponding to a satisfied rule is assigned to the data.

26. The apparatus of claim 25, wherein the algorithm assigns the RAID level corresponding to the first-firing rule to the data.

27. The apparatus of claim 25, wherein the algorithm applies a default rule to the data if none of the rules fire.

28. The apparatus of claim 25, wherein the algorithm applies at least one utilization rule to the data.

29. The apparatus of claim 28, wherein the utilization rules include a rule for capacity-bound workloads, and wherein an appropriate RAID level is assigned to capacity-bound workloads.

30. The apparatus of claim 28, wherein the utilization rules include a rule for bandwidth-bound workloads, and wherein an appropriate RAID level is assigned to bandwidth-bound workloads.

31. The apparatus of claim 20, wherein the algorithm includes a model of the device and data workload, the model determining the RAID levels.

32. The apparatus of claim 31, wherein the model includes a set of formulas that, given a particular workload, or combination of workloads, determines the utilization of components of the device.

33. The apparatus of claim 31, wherein the model determines device configuration parameters in addition to RAID levels.

34. The apparatus of claim 31, wherein the data is characterized as at least one store and stream; and wherein if a store is not capacity-bound, the model estimates the number of I/O operations per second (IOPS) that will be generated by each stream for each RAID level being considered, and the algorithm selects the RAID level resulting in the smallest number of per-disk IOPS.

35. A system comprising:

a data storage device having multiple RAID levels;

means for applying an algorithm to at least one of a set of device specifications and workload specifications for data that will be stored in the device, the algorithm identifying RAID levels for the data; and means for configuring the data storage device according to the identified RAID levels prior to initially storing the data in the data storage device.

36. An article for instructing a processor to assign RAID levels to data prior to loading the data in a data storage device, the data characterized by at least one of device specifications and workload specifications the device having multiple RAID levels, the article comprising:

computer memory; and a RAID level identifying program encoded in the memory, the program, when executed, instructing the processor to process at least one of the characterizing specifications to identify RAID levels for the data prior to loading the data in the data storage device.

* * * * *